: US 11,359,903 B2
(45) Date of Patent: Jun. 14, 2022

(12) United States Patent
Ney et al.

(54) ROLLER TAPE MEASURE WITH EXTENSIBLE STRETCHING AND MEASURING DEVICE

(71) Applicant: Hoechstmass Balzer GMBH, Sulzbach (DE)

(72) Inventors: Carsten Ney, Frankfurt (DE); Klaus Krebs, Bad Soden (DE)

(73) Assignee: HOECHSTMASS BALZER GMBH, Sulzbach (DE)

(*) Notice: Subject to any disclaimer, the term of this patent is extended or adjusted under 35 U.S.C. 154(b) by 0 days.

(21) Appl. No.: 17/258,104

(22) PCT Filed: Jun. 18, 2019

(86) PCT No.: PCT/IB2019/055093
§ 371 (c)(1),
(2) Date: Jan. 5, 2021

(87) PCT Pub. No.: WO2020/008286
PCT Pub. Date: Jan. 9, 2020

(65) Prior Publication Data
US 2021/0278190 A1  Sep. 9, 2021

(30) Foreign Application Priority Data

Jul. 6, 2018 (DE) ..................... 10 2018 116 482.3

(51) Int. Cl.
*G01B 3/1069* (2020.01)
*G01B 3/1046* (2020.01)
(Continued)

(52) U.S. Cl.
CPC ......... *G01B 3/1069* (2020.01); *G01B 3/1007* (2020.01); *G01B 3/1046* (2020.01); *G01B 2003/1033* (2013.01)

(58) Field of Classification Search
CPC .. G01B 3/1069; G01B 3/1007; G01B 3/1046; G01B 2003/1033; G01B 3/1003; G01B 3/1084
See application file for complete search history.

(56) References Cited

U.S. PATENT DOCUMENTS 6,349,483 B1 * 2/2002 Dodge, Sr. ........... G01B 3/1056
33/758
6,497,050 B1 * 12/2002 Ricalde ................ G01B 3/1071
33/759

(Continued)

FOREIGN PATENT DOCUMENTS

| AT | 222494 B | 7/1962 |
| CA | 2305094 A1 | 10/2001 |
| DE | 202005011814 U1 | 8/2006 |

OTHER PUBLICATIONS

English translation of International Search Report in PCT/IB2019/055093 dated Oct. 24, 2019.

(Continued)

*Primary Examiner* — Yaritza Guadalupe-McCall
(74) *Attorney, Agent, or Firm* — Ralph E. Jocke; Walker & Jocke

(57) ABSTRACT

Exemplary embodiments relate to a roller tape measure comprising a housing and a flexible measuring tape that is in operative connection with the housing and that includes scale indicia on a surface thereof. The measuring tape extends within an interior area of the housing and includes a length portion that is selectively variably extendable and retractable from the housing interior area. The housing includes a hook in operative connection therewith that is movable between an extended position and a retracted position independently of extension and retraction of the measuring tape. The hook includes a hook bend portion with a measuring edge that extends perpendicular the measuring (Continued)

tape surface to facilitate reading of the scale indicia for measurement. In the extended position of the hook, the hook is configured to engage an article of flexible material to enable a portion of the article to be stretched for measurement.

20 Claims, 8 Drawing Sheets

(51) Int. Cl.
  *G01B 3/1007* (2020.01)
  *G01B 3/1005* (2020.01)

(56) References Cited

U.S. PATENT DOCUMENTS

| | | | | |
|---|---|---|---|---|
| 6,536,698 B2* | 3/2003 | Hsu | ...................... | G01B 3/1005 242/381.3 |
| 6,938,354 B2* | 9/2005 | Worthington | ............ | C12N 9/88 33/768 |
| 6,976,318 B2* | 12/2005 | Odachowski | ........ | G01B 3/1041 33/759 |
| 6,996,915 B2* | 2/2006 | Ricalde | ................ | G01B 3/1071 33/768 |
| 7,159,332 B2* | 1/2007 | Sullivan | ............... | G01B 3/1061 33/770 |
| 7,181,860 B1* | 2/2007 | Umholtz | .............. | G01B 3/1056 33/770 |
| 7,263,785 B2* | 9/2007 | Sullivan | ............... | G01B 3/1061 33/768 |
| 7,918,037 B1* | 4/2011 | Polkhovskiy | ........ | G01B 3/1056 33/770 |
| 11,112,227 B1* | 9/2021 | Lopez | .................. | G01B 3/1071 |
| 2003/0154617 A1* | 8/2003 | Ricalde | ................ | G01B 3/1061 33/770 |
| 2006/0236555 A1* | 10/2006 | Sullivan | ............... | G01B 3/1061 33/770 |
| 2008/0098610 A1* | 5/2008 | Lipps | .................. | G01B 3/1084 33/770 |
| 2008/0168674 A1* | 7/2008 | Nielson | .................... | G01B 3/10 33/765 |
| 2010/0275456 A1 | 11/2010 | Lord | | |
| 2015/0089826 A1* | 4/2015 | Villalpando | ......... | G01B 3/1061 33/701 |
| 2021/0278190 A1* | 9/2021 | Ney | .................... | G01B 3/1003 |

OTHER PUBLICATIONS

Written Opinion of International Search Authority (not in English) in PCT/IB2019/055093 dated Oct. 24, 2019.

* cited by examiner

ROLLER TAPE MEASURE WITH EXTENSIBLE STRETCHING AND MEASURING DEVICE

TECHNICAL FIELD

Exemplary embodiments relate to a roller tape measure, having a housing and an extendable tape measure that protrudes from a housing opening or slot.

BACKGROUND

For measuring sizes of an industrially produced product, for example during quality inspection, it is necessary to measure the product individually in either an automated or manual manner. During quality inspection or for sampling inspection, each individual product is subjected to a precise, non-destructive measurement and therefore, a conclusion can be drawn about the factors influencing production from the comparison of the measured value of a large number of the measured products. In the textile industry, where a large proportion of manual manufacturing is common, it is very important to investigate the precise size of the textiles produced because the actual size of an article of clothing produced in series may change due to a multiplicity of manufacturing factors that are not necessarily stable. Devices, including tape measures, for measuring the size of objects and clothing may benefit from improvements.

SUMMARY OF THE DISCLOSURE

It is the object of the exemplary embodiments to provide an exemplary roller tape measure for use in quality inspection and/or in sampling inspection, with the aid of which a large number of measurements can be carried out reliably and easily by the user.

The object according to the exemplary embodiments is achieved by means of an exemplary stretching and measuring device, also referred to herein as hook, which can be extended from a housing and which is arranged in front of a housing opening or slot when the exemplary stretching and measuring device is in an extended state. In exemplary embodiments, the exemplary hook is used as a stretching and measuring device for the exact reading of a scale on the tape measure. Further advantageous configurations are specified in the appended claims.

According to the exemplary embodiments, it is therefore provided, that the exemplary roller tape measure has a type of stretching and measuring device, for example, in the form of a hook. In exemplary embodiments, the exemplary stretching and measuring device is part of the roller tape measure and not a supplementary element that can be separated from the same. On the one hand, the exemplary hook is used as an auxiliary element for the exact placement of the tape measure onto the measured object. On the other hand, the exemplary hook may be used to stretch the textile article of clothing or other flexible material, such as a waistband for example, but also any other form of openings in articles of clothing or other flexible material, thus to ensure a uniform measuring condition during the measurement of a multiplicity of similar or identical articles of clothing, so that the exemplary hook is available to the user as an additional finger.

In an exemplary embodiment of the roller tape measure, it is provided that the exemplary stretching and measuring device is constructed in the form of a hook and preferably has a straight reading or measuring edge. The purely optical reading of the measured value by the human eye is facilitated by the exemplary straight reading edge.

For an industrial use of the exemplary embodiments during quality inspection and for performing as many measurements as possible in a short time, it is advantageous if a circuit including an electronic reading device is present in the housing of the exemplary roller tape measure for the electronic reading of the scale. The exemplary circuit including the reading device sends the measurement result to a remote receiver via a wireless protocol by means of a request signal in the form of a pressable button on an electric switch.

In exemplary embodiments, in order to take account of the various states of the exemplary roller tape measure, it may be provided that an electronic switch or sensor present in the housing detects the extended state of the exemplary extensible stretching and measuring device and forwards the same to the exemplary circuit including the electronic reading device, which subtracts a predefined value from the measurement result corresponding to the state or position of the hook, in order to take into account the position of the exemplary extensible stretching and measuring device in the measurement result.

In exemplary embodiments, in order to check the measurement, which is sent to a remote receiver, an electronic display device, which displays the measurement result, may likewise be present in a surface of the housing and in operative connection with the exemplary circuit.

For sufficient stability during industrial use of the exemplary embodiments, the exemplary stretching and measuring device constructed as a hook should be designed to be so stable that it can accommodate a tensile force of up to 5 kg (approx. 50 N), in some exemplary embodiments even 10 kg (approx. 100 N) and even more in other exemplary embodiments. This prevents the exemplary stretching and measuring device from being torn off.

For a particularly ergonomic design of the exemplary roller tape measure, it is provided that a thumb-operable button or brake is present for locking the exemplary measuring tape measure in the roller tape measure.

In the exemplary roller tape measure, the exemplary tape measure may have an optical indicia or other coding for electronic reading, wherein the exemplary optical coding has an absolute scale, that is to say the coding at each point of the tape measure is structured such that from this coding at the respective point, the absolute scale of the tape measure can be read, wherein the exemplary coding may for example be sought from the group consisting of: optical clock marks, scale embodiment using the vernier method by means of two scale embodiments with different frequency arranged next to one another, a barcode and incremental code, which makes it possible to determine the correct size by counting along during extension. Thus, other optical machine-readable codings or other indicia with absolute dimension coding are considered. Thus, the exemplary scale may also not be structured as an absolute dimension. In this case, a detector or sensor counts the passage of optical markings and counts the forwards or backwards passage of the optical markings and therefore calculates the current size position. Due to the absolute code, it is easily possible for the user to calibrate the tape measure. To this end, the user only needs a type of reference metre, which they measure using the tape measure. For calibration by an official qualified therefor, it is possible to proceed accordingly.

For complication-free use of the exemplary embodiments, it is possible to provide that the exemplary roller tape measure has a contactless charging device for the electronic reading device in the form of inductively coupled power transmission.

To check the carrying out of the measurement process, it is provided in a further exemplary embodiment, that the exemplary electronic roller tape measure has an electronic-capabilities.

Depending on the use type of the exemplary embodiments, it may be advantageous if the exemplary stretching and measuring device can permanently be locked in the extended state. In this case, the exemplary stretching and measuring device can be pulled out either during the first use and no longer retracted thereafter due to the locking or else already be permanently locked during manufacturing. This locking makes sense if the various measurement functions should be reduced to one measurement function, in order to simplify training operations for interaction with the exemplary electronic tape measure.

DETAILED DESCRIPTION OF THE EXEMPLARY EMBODIMENTS

Figure 1:
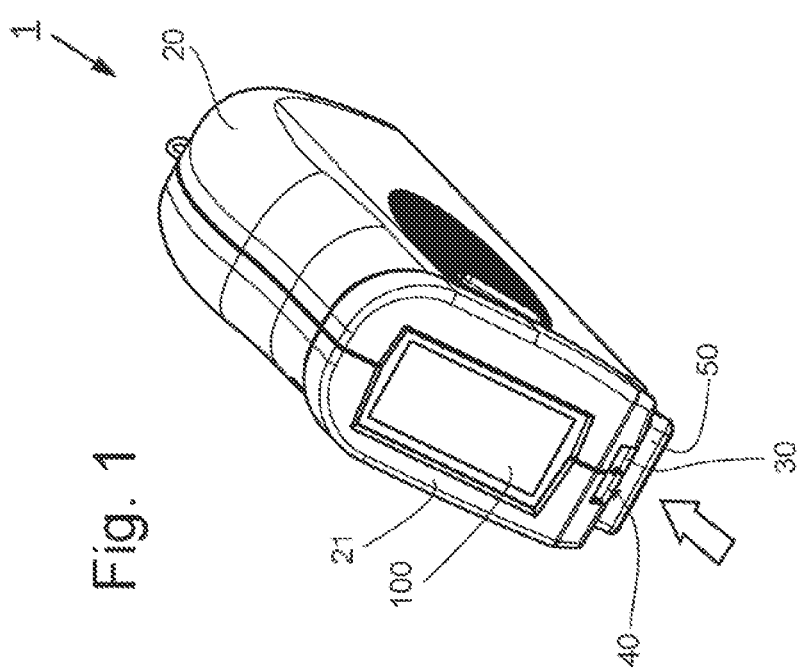
FIG. 1 shows a perspective view of the exemplary roller tape measure with an exemplary extensible stretching and measuring device in the retracted state.
Figure 2:
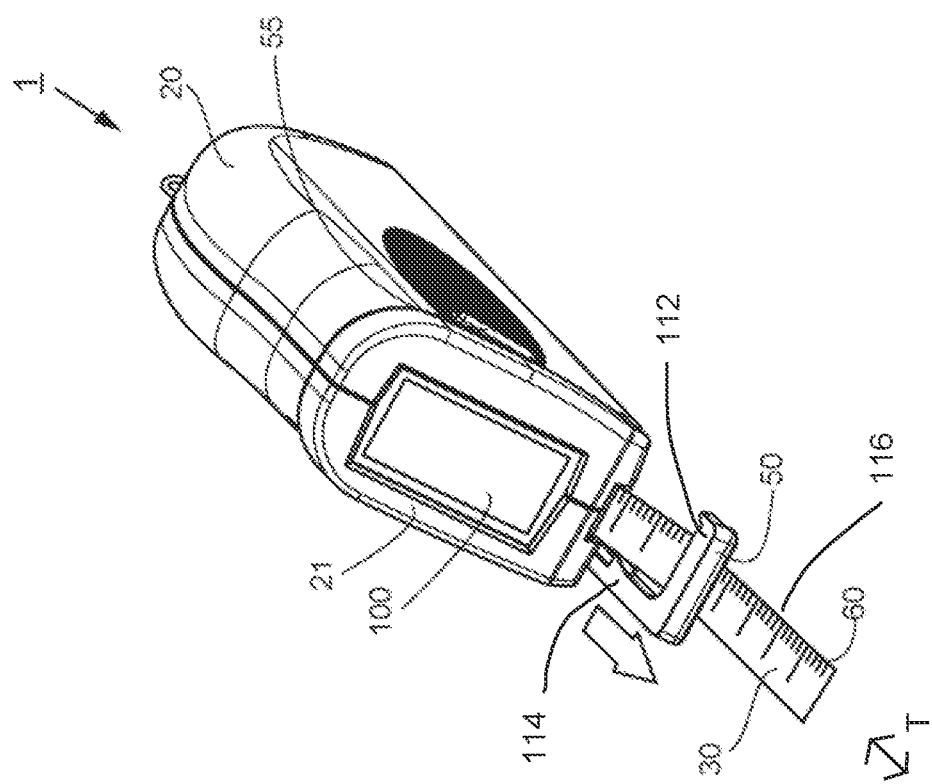
FIG. 2 shows the roller tape measure with an exemplary extensible stretching and measuring device in the extended state.

In FIGS. 1 and 2, an exemplary roller tape measure 1 is illustrated. The exemplary roller tape measure 1 has a housing 20 and an extensible tape measure 30, also referred to herein as a flexible measuring tape. The exemplary extensible tape measure 30 protrudes from a housing slot 40, also referred to herein a housing opening. The exemplary measuring tape 30 extends within an interior area of the housing 20 and is in operative connection with the housing 20. The exemplary measuring tape 30 includes a length portion 116 that is selectively variably extendable outside of the housing interior area through the opening 40, and is retractable into the housing interior through the opening 40. The measuring tape extends outside the housing along a tape direction T. The exemplary measuring tape 30 includes a measuring tape surface that has scale indicia thereon, which will be described in more detail later on, that is usable for measurement of articles comprised of flexible material.

The exemplary embodiments further include a stretching and measuring device 50, also referred to herein as a rigid hook. The exemplary hook 50 includes a hook bend portion 112 and hook shank portion 114. The exemplary hook shank portion 114 is in operative movable connection with the housing 20 and extends parallel to the tape direction and the length portion of the measuring tape 116 that is extendable from the housing. The exemplary hook bend portion 112 extends perpendicular to the shank portion 114 and the measuring tape 30. The exemplary bend portion 112 extends transversely across the measuring tape surface including the scale indicia, and is disposed on the outside of the housing. As will be discussed in more detail, the exemplary hook includes and is bounded in the tape direction by at least one measuring edge that facilitates manual reading of the scale indicia to obtain measurements of the articles of flexible material.

The exemplary stretching and measuring device (hook) 50 is movably mounted in operative connection with the housing and can be extended outward from the housing 20. For example, the exemplary stretching and measuring device 50 can be changed from a retracted state (FIG. 1), and as is illustrated by the arrow in FIG. 2, moved into an extended state. The hook is movable relative to the housing in a hook direction (along the arrows in FIGS. 1 and 2) that is parallel to the tape direction. In the extended position, the exemplary stretching and measuring device 50 is extended in the hook direction and is arranged in front of the housing slot (opening) 40. In the extended position of the hook 50, the bend portion 112 of the hook 50 is disposed away from the opening and the housing 20. In the retracted position of the hook, the hook bend portion 112 is positioned more closely adjacent to the housing 20. The exemplary hook 50 is movable in the hook direction between the extended position and the retracted position independently of the measuring tape 30 such that the length portion 116 of measuring tape 30 is extendable and retractable in the tape direction relative to the housing 20 when the hook 50 is in either the extended position or the retracted position.

Figure 5:
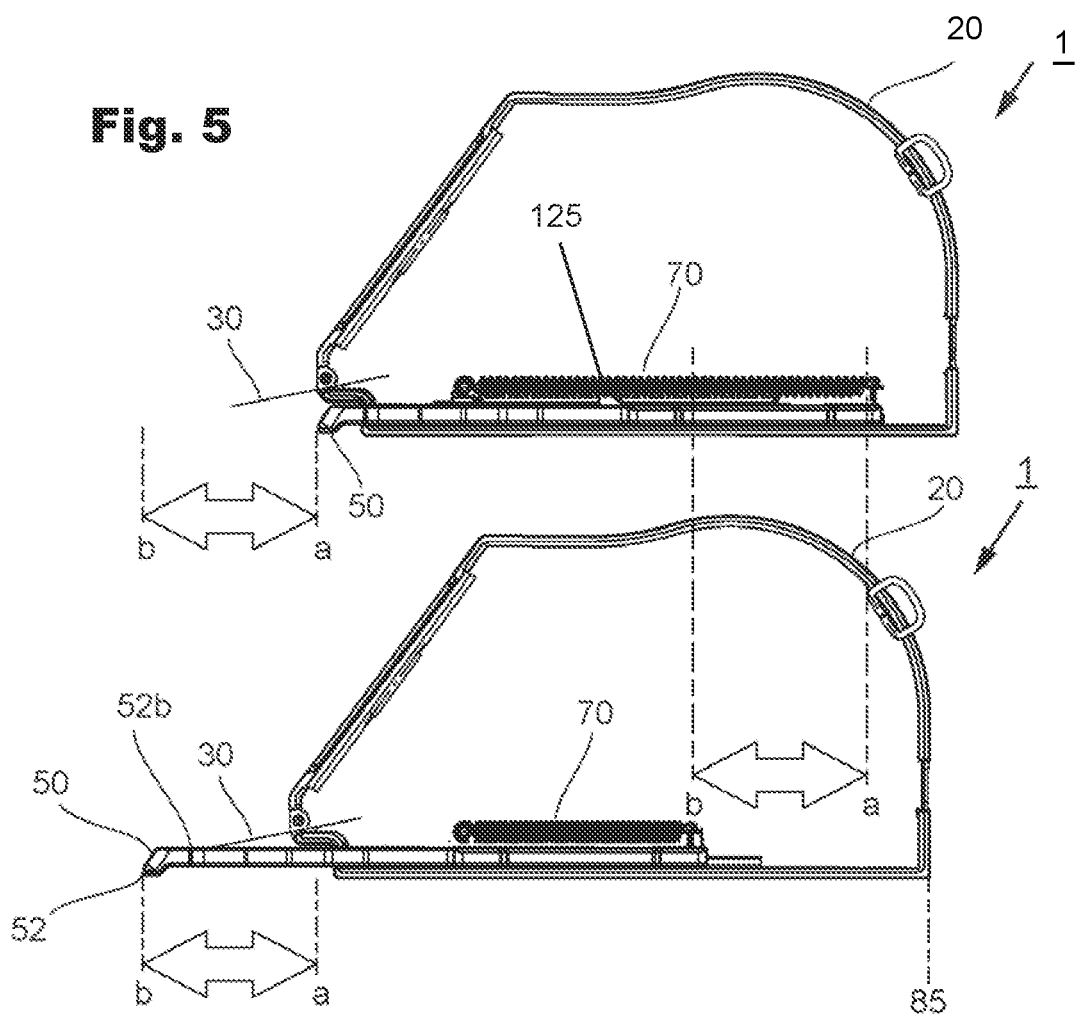
FIG. 5 shows a cross sectional view of an exemplary spring mechanism showing retraction and extension of the exemplary extensible stretching and measuring device.
Figure 7:
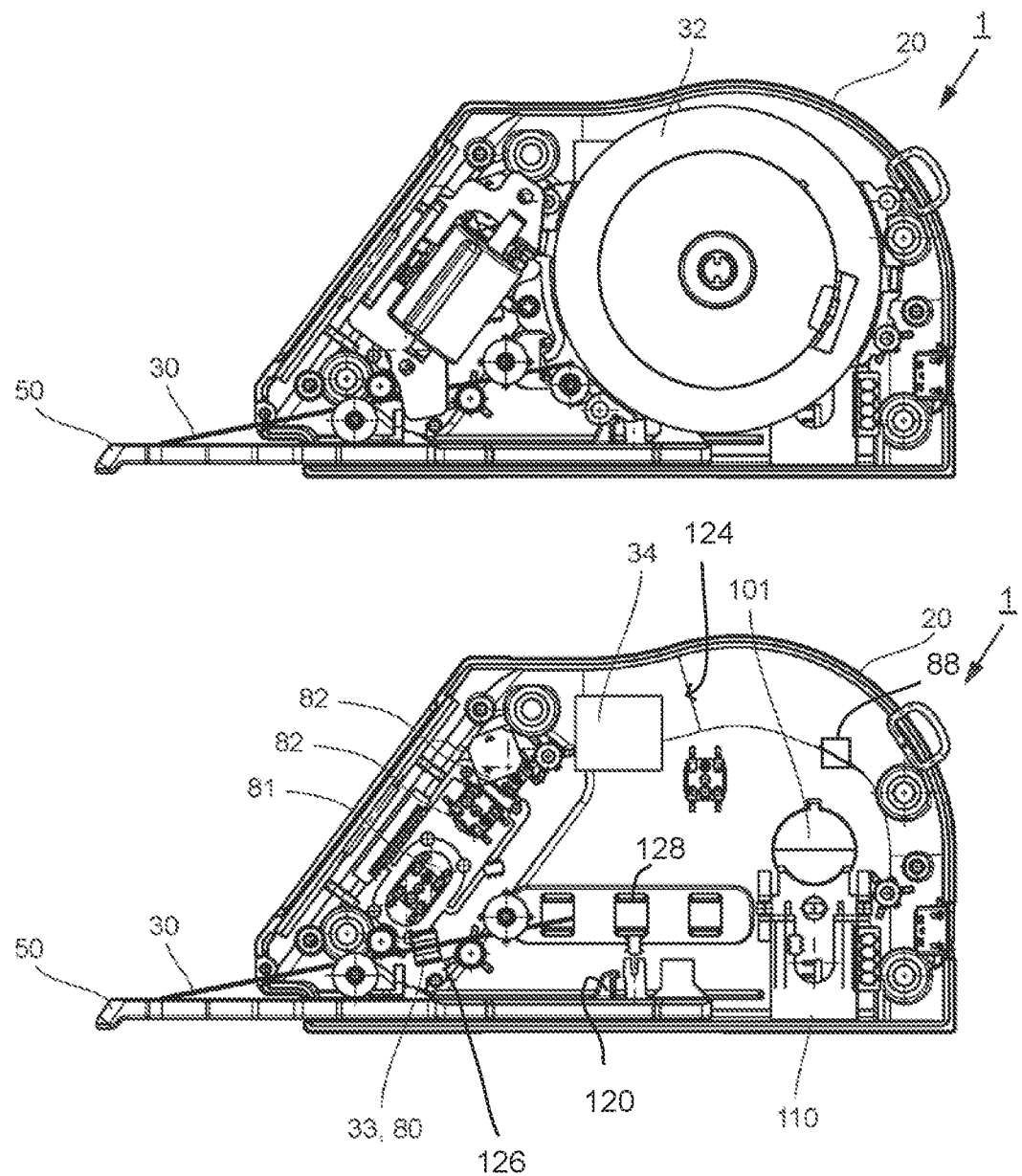
FIG. 7 shows two plan views of the exemplary interior of the exemplary roller tape measure of FIG. 1.

As shown best shown in FIGS. 1, 5, and 7 the roller tape measure 1 further includes a hook stop that in the exemplary arrangement is comprised of an elongated slot which is alternatively referred to as a recess 118, and at least one projection 120. The exemplary hook stop is operative to prevent the hook 50 from being moved in the hook direction away from the opening beyond the extended position of the hook. In exemplary embodiments, the elongated slot 118 extends in the hook shank 114 parallel to the hook direction and is bounded longitudinally by slot ends 122 that extend perpendicular to the hook direction. The exemplary projection 120 is in fixed operative connection with the housing 20 and extends from a base of the housing through the elongated hook slot 118. In exemplary embodiments, the at least one projection 120 and a hook slot end are engaged when the hook 50 is in the extended position to prevent the hook bend portion 112 from being moved further away from the housing. It should be understood that this arrangement of the projection and the slot is exemplary, and in other embodiments, other arrangements may be used; for example, the slot and projection arrangement may be reversed.

The extended position of the hook 50 corresponds to an exemplary first use type of the stretching and measuring device (hook) 50 for the exact placement at a measuring point on the product to be measured. The exemplary stretching and measuring device 50 facilitates and enables precise viewing and placement of the measuring edge and also visual reading of the scale indicia on the exemplary tape measure 30 simultaneously due to its shape. In order to prevent the stretching and measuring device 50 from getting caught when not in use, for example, from sticking in the trouser pocket when carried or, if used in the textile sector, damage to the materials to be processed due to pulled threads, it is provided that the stretching and measuring device 50 can be retracted to the retracted position in which the exemplary hook 50 is operatively positioned within or underneath the exemplary housing 20 and is held in place by a manually actuatable latch 125, and responsive to actuation of the latch is enabled to be thereafter again extended from the exemplary housing 20.

In exemplary embodiments, the exemplary roller tape measure is realized as an electronic roller tape measure including at least one circuit 124 and at least one sensor 126. In addition to the already explained exemplary elements, the exemplary electronic roller tape measure 1 also additionally includes a display device or screen 100 (display) in operative connection with the circuit 124, on which a visual output corresponding to the current measured value, determined by the circuit 124 through analysis of the position of the scale indicia on the tape measure 30 relative to the stretching and measuring device 50 can be read. For electronic reading, an optical coding 31, also referred to herein as scale indicia, is printed onto the rear side of the exemplary tape measure 30, which exemplary optical coding is read in the interior of the exemplary roller tape measure 1 by means of at least one sensor 126 including an optical sensor 33 and forwarded to an electronic reading/measuring device 34, of the exemplary circuit 124. In some exemplary embodiments, the exemplary circuit 124 including the electronic measuring device 34 interprets the exemplary optical coding 31, calculates a measured value therefrom (which is alternatively referred to herein as a measurement value), and forwards the calculated measured value to the display device 100 to display the output measured value thereon.

Figure 3:
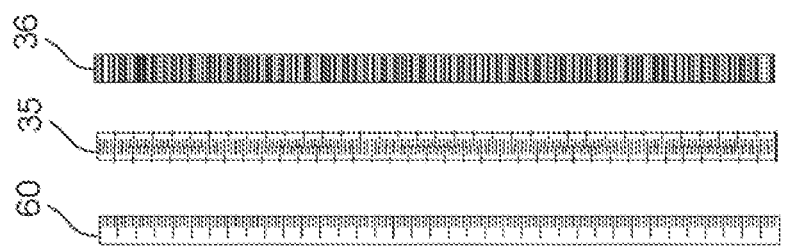
FIG. 3 shows an exemplary scale and an exemplary optical indicia or coding on the exemplary tape measure of the exemplary roller tape measure of FIG. 1.

The exemplary scale 60, also referred to herein as scale indicia, on the front surface of the tape measure 30 is depicted on the left side of FIG. 3. In alternative exemplary embodiments, it is also possible that no scale that is readable by humans is desired and is therefore not present. An exemplary scale 35 or an exemplary barcode 36 present on the rear side of the exemplary tape measure 30 are correspondingly illustrated on the central and right side of FIG. 3. An exemplary optical coding of the exemplary tape measure 30 may be present in the form of optical marks, as an exemplary scale 35 using the vernier method with two scale embodiments (FIG. 3, centre) of different frequency arranged next to one another or as an exemplary barcode 36 (FIG. 3, right). Finally, an exemplary coding can also be structured sequentially, wherein a detector or sensor counts the passage of a coding and determines the measuring position of the exemplary tape measure 30 therefrom computationally.

Figure 4:
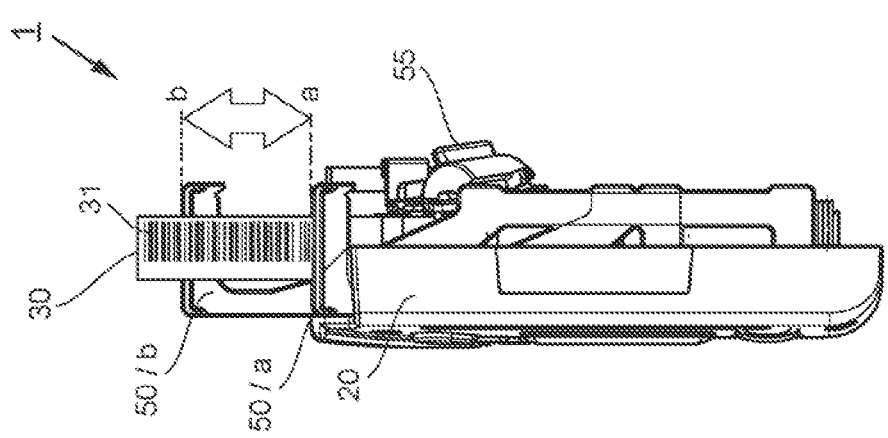
FIG. 4 shows a bottom side view of the exemplary roller tape measure of FIG. 1 from below, with one half of the exemplary housing open.

A view of the exemplary roller tape measure 1 of FIG. 1 is illustrated from below and with one half of the exemplary housing 20 open is illustrated in FIG. 4. Due to the exemplary housing, one half of which is open, it is possible to see how the exemplary stretching and measuring device 50 moves from a first (retracted) position (a) into a second (extended) position (b), both positions of the exemplary stretching and measuring device 50 are illustrated in this sketch and overlap spatially as a result. In the exemplary housing 20, an exemplary thumb lever 55 is revealed, which is part of a thumb-operable tape measure brake 53. The exemplary thumb operable tape measure brake 53 fixes the length portion exemplary tape measure 30 pulled out of the housing 20 and locks the tape measure against the restoring force of an exemplary coil spring for pulling in the tape measure 30. The exemplary thumb lever 55 may in this case execute yet further, cumulative or alternative functions, for example, to be used as a control element for electronic navigation by means of a graphical operating system of an electronic reading device 80 in operative connection with the exemplary circuit 124.

The silhouette of the exemplary housing 20 of the exemplary roller tape measure 1 is illustrated in FIG. 5, into which the exemplary stretching and measuring device 50 is inserted together with an exemplary tension spring 70. The exemplary stretching and measuring device 50 can be moved from a first position (a) (retracted state) into a second position (b) (extended state) and locked in these positions, at least fixed by an exemplary latching device. The exemplary latching device is 125 manually actuatable and is in operative connection with the housing 20 and the hook 50. The exemplary latching device is manually engageable from outside of the housing 20 to change the latch between a latch hold position in which the hook 50 is held in the retracted position, and a latch release position in which the hook 50 is enabled to be moved from the hook retracted position to the hook extended position responsive at least in part to the biasing force of the spring 70.

In the retracted state (FIG. 5, top) of the exemplary stretching and measuring device 50 the exemplary tension spring 70 is lengthened and tensioned, and in the extended state of the exemplary stretching and measuring device 50 the exemplary tension spring 70 is less tensioned and short. In exemplary embodiments, the exemplary spring 70 is in operative connection with a fixed portion of the housing 20 and is also in operative connection with a portion of the hook shank portion 114 disposed away from the hook bend portion 112 and disposed within the housing 20. The exemplary spring 70 extends between the fixed portion of the housing 20 and the portion of the hook shank portion 114 disposed away from the hook bend portion 112. The exemplary spring 70 is operative to bias the hook 50 in the hook direction toward the extended position. The path of the exemplary stretching and measuring device (hook) 50 is clarified by the double arrow between the first position (a) and the second position (b) in both drawings, FIG. 5 top and FIG. 5 bottom. The exemplary tension spring 70 is relaxed during the extension of the exemplary stretching and measuring device 50.

Due to the different positions (a) and (b), two different placement positions and measuring edges of the exemplary hook 50 result, which are advantageous depending on the use type. It is possible to use the exemplary outer measuring/reading edge 52 on the front edge of the exemplary stretching and measuring device 50 in the retracted state (a) In exemplary embodiments, an exemplary automatic changeover switch or an exemplary manual changeover switch, such as exemplary operating buttons 81, 82 and 83, and at least one sensor configures the exemplary circuit 124 including the electronic reading device 80 together with the display device 100 in such a manner that the measurement displayed as an output on the display screen 100 is based on the sensor 30 reading the scale indicia corresponding to the exemplary outer measuring/reading edge 52 of the bend of the hook in the retracted state (a). As a result the circuitry determines a distance in a tape direction away from the housing that the length portion extends beyond the measuring edge 52. It is also possible to use the exemplary outer measuring/reading edge 52 on the front edge of the exemplary stretching and measuring device 50 in the extended state (b). Similarly, in exemplary embodiments, an exemplary automatic changeover switch or an exemplary manual changeover switch, such as exemplary operating buttons 81, 82 and 83, and at least one sensor configures the exemplary circuit 124 including the electronic reading device 80 together with the exemplary display device 100 in such a manner that the measurement displayed as an output on the display screen 100 is based on a reading of the scale indicia corresponding to the exemplary outer measuring/reading edge 52 in the extended state (b). Due to the exemplary manual changeover switch, such as the exemplary operating buttons 81, 82 and 83, it can also be set up that the measurement displayed on the screen 100 is based on a reading of the scale indicia corresponding to the exemplary inner measuring/reading edge 52b on the rear side edge of the exemplary stretching and measuring device 50 in the extended state (b). Due to the same exemplary operating buttons 81, 82, and 83 or due to a different exemplary switch, the exemplary circuit 124 including the electronic reading device 80 together with the exemplary display device 100 can also be configured in such a manner that the distance measurement is determined and is displayed on the rear 85 of the exemplary housing 20.

In exemplary embodiments, the exemplary at least one sensor includes a hook position sensor 128. The exemplary hook position sensor 128 is in operative connection with the housing 20 and the circuit 124. The exemplary hook position sensor 128 is operative to determine whether the hook 50 is in the extended position or in the retracted position. The exemplary circuit 124 is operative to determine a measurement value of the article of flexible material responsive at least in part to the sensed position of the hook.

In further exemplary embodiments, the exemplary at least one measuring edge of the bend portion 112 of the hook 50 includes the outer measuring (reading) edge 52 and the inner measuring (reading) edge 52b. The exemplary outer measuring edge 52 is included on a bounding face of the bend portion 112 that extends transversely across the measuring tape 30 and which face is disposed away from or facing away from the housing 20. The exemplary inner measuring edge 52b extends on a further bounding face of the bend portion 112 of the hook 50 that also extends transversely across the measuring tape 30, however, the further face of the bend portion 112 including the inner measuring edge 52b is in facing relation with the housing 20.

Still further, in exemplary embodiments, the housing includes at least one button 81, 82, 83 operatively mounted thereon. The exemplary at least one button 81, 82, 83 is in operative connection with the circuit 124. The exemplary circuit 124 includes instructions corresponding to an inner measuring edge mode and outer measuring edge mode. The exemplary at least one button includes a measuring mode switch that is engageable from outside the housing 20 to change the circuit 124 between the outer measuring edge mode and the inner measuring edge mode. In the outer measuring edge mode, the circuit 124 is operative to determine the measurement distance value according to the outer measuring edge 52, and in the inner measuring edge mode, the circuit 124 is operative to determine the measurement value according to the inner measuring edge 52b.

Figure 6:
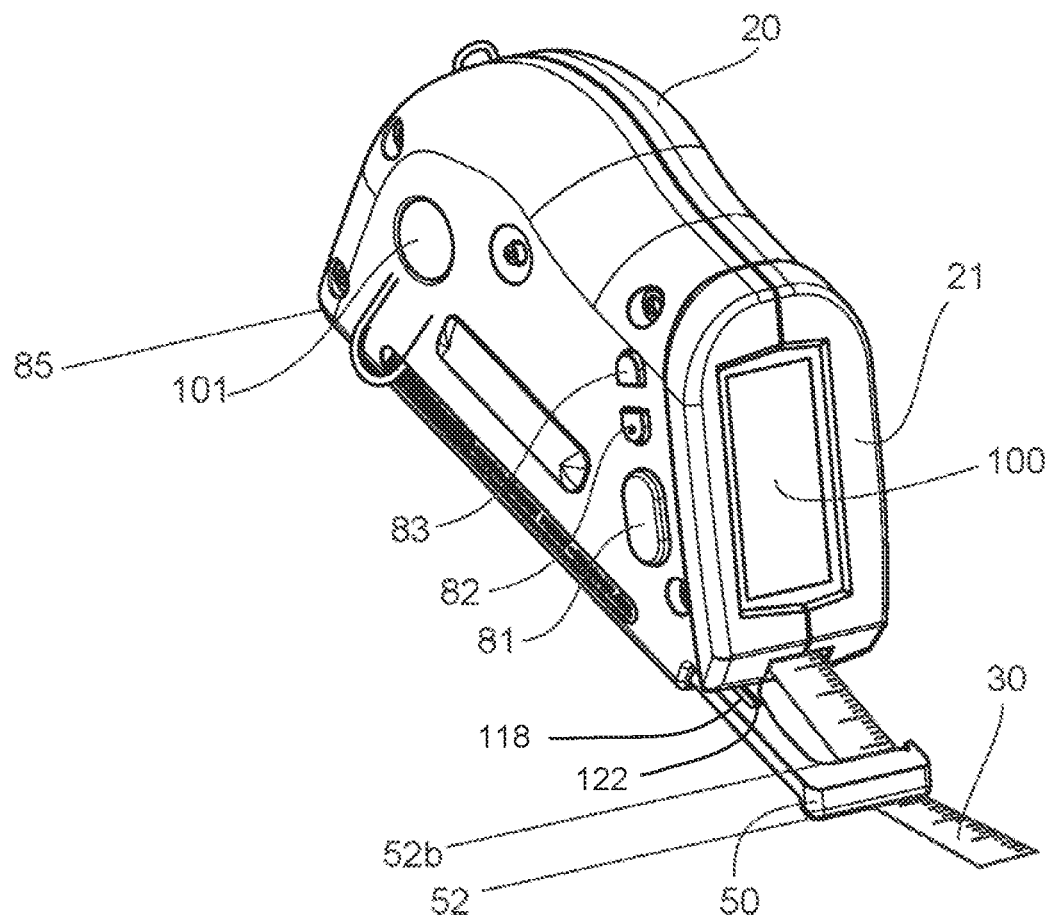
FIG. 6 shows a perspective side view of the exemplary roller tape measure of FIG. 1 in an exemplary first typical measuring application type.

A perspective rear side view of the exemplary roller tape measure 1 from FIG. 1 is illustrated in an exemplary first typical application type in FIG. 6. The rear side view of the exemplary roller tape measure 1 gives a clear view of the exemplary buttons that can be operated using the fingers of the right hand. However, these exemplary buttons can also be operated very well using the thumb of the left hand. These exemplary operating buttons 81, 82, 83 for the exemplary circuit 124 including the electronic reading device 80 in the interior of the housing can be configured freely and populated with two functions in each case. In this first typical application type, the exemplary stretching and measuring device 50 can be used to place the unrolled tape measure 30 onto the surface to be measured. The measurement of the stretched tape measure 30 can comfortably be read using the exemplary stretching and measuring device 50. In this perspective view, it is also possible to see how the measurement can be visually read on the exemplary reading edge 52b on the rear side edge of the exemplary stretching and measuring device 50 in the extended state (b).

A view onto the inner details of the exemplary roller tape measure 1 according to the exemplary embodiments is shown in FIG. 7, in which the front housing wall of the exemplary housing 20 is taken off and the exemplary tension spring 70 has been removed. As illustrated in the upper sketch of FIG. 7, an exemplary reel 32 for the exemplary tape measure 30 is located in the interior of the exemplary roller tape measure 1. The exemplary tape measure 30 is guided between the exemplary reel 32 and the exemplary housing slot (opening) 40 past the exemplary optical sensor 33, which reads the exemplary optical coding (scale indicia) 31 printed on the rear side of the tape measure 30 and forwards the same to the exemplary circuit 124 including the electronic reading/measuring device 34, 80, which interprets the detected optical code and calculates a measured distance value therefrom. The exemplary circuit 124 including the electronic reading/measuring device 34, 80 forwards the calculated measured value to the exemplary display device 100 (display) as an output display value, where it can be read by the user. At the push of one of the exemplary buttons, the calculated measured distance value can also be conveyed by means of an exemplary transmitter 88 and wireless protocol, such as for example by means of BlueTooth®, to an exemplary remote receiver, where the determined and transmitted measured distance value is entered into statistics, for example for quality inspection. In such exemplary embodiments, the transmitter 88 is in operative connection exemplary circuitry 124 and is operative to send at least one signal that is receivable by at least one remote electronic device. The exemplary circuitry 124 is operative to cause the transmitter to send the least one signal including data corresponding to the determined distance measurement value.

In exemplary embodiments, an exemplary electronic switch or sensor, such as the hook position sensor 128 is present in the housing 20 which detects at least one of the extended or retracted state of the exemplary extensible stretching and measuring device (hook) 50 and forwards the same to the exemplary circuit 124 including the electronic reading/measuring device 34, 80. The exemplary circuit 124 includes instructions that are operative to subtract a predefined value corresponding to the extended or retracted state of the exemplary hook 50 from the determined measurement result. Thereby, the position of the exemplary extensible stretching and measuring device 50 is taken into account in the measurement result. Depending on the use case and selected mode, the exemplary predefined value may relate to the inner 52 or outer measuring edge of the hook 52b (internal and external measurements). The predefined value can be selected and set in the menu. The exemplary thumb lever 55 can be seen in the top sketch of FIG. 7, which on the one hand can be used as a mechanical control element of the exemplary thumb-operable tape measure brake 53, but also as an exemplary lever for navigation in a graphical operating system, which is output on the display device 100 (display). In the bottom sketch of FIG. 7, the exemplary reel 32 and the exemplary thumb lever 55 are removed, so that the inner rear side view onto the exemplary operating buttons 81, 82, 83 can be seen.

Figure 8:
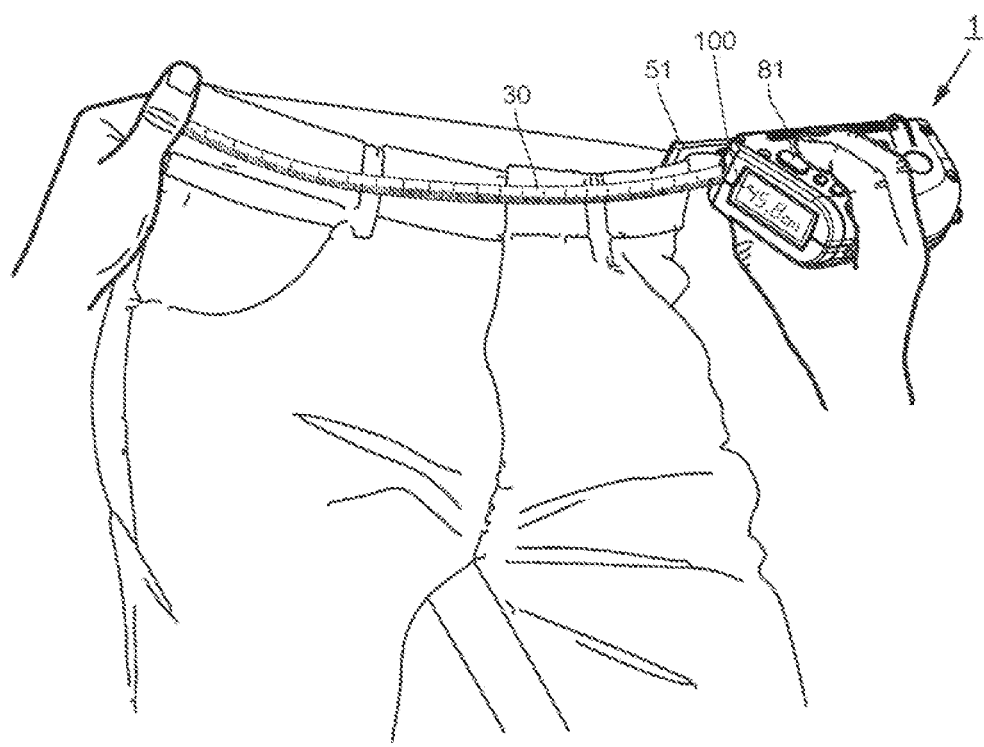
FIG. 8 shows a perspective view of an exemplary second measuring use type of the exemplary roller tape measure from FIG. 1.

Finally, a second use type of the exemplary roller tape measure 1 is shown in FIG. 8. A waistband is stretched using the exemplary stretching and measuring device 50, which is constructed as an exemplary hook and can be extended from the exemplary hand holdable housing 20 to enable flexible material to extend between the housing and the bend portion. For measuring, the user secures e.g. the left part of a waistband using the left hand and the user holds the exemplary roller tape measure with the right hand, in order to operate it by pressing the exemplary buttons. In this case, the exemplary measuring edge 52b is used as a reading edge. As the right hand is then no longer free, the user can stretch the right part of the waistband by housing and hand movements using the exemplary hook as a replacement for a further finger, and therefore measure the size of the waistband for quality inspection or for sampling inspection. A left handed person correspondingly carries out the measurement the other way around. In this manner, the measurement of a waistband can be carried out comfortably in large numbers, as is conventional in textile production for a quality inspector. Usual quantities for a quality inspector may lie between 500 and 2,000 textiles that must be measured per working day. For this use type, it is provided that the exemplary stretching and measuring device 50 constructed as a hook 51 is designed to be so stable that this can accommodate a tensile force of up to 5 kg (approx. 50 N), so as to not be destroyed during hectic measurement under time pressure, possibly with rough handling.

The illustrated embodiments of the exemplary roller tape measure have a "handedness", it is a right-handed design. However, the exemplary roller tape measure may also be structured mirror-inverted as a left-handed design. This means the exemplary roller tape measure shown is optimized for use with the right hand, as is illustrated in FIG. 8. According to the exemplary embodiments, it is provided that an exemplary thumb-operable button, exemplary thumb lever 55, exemplary tape measure brake 53 and a further, exemplary finger-operable button 101 for fixing the exemplary tape measure and/or for reading a measured distance value by means of the exemplary circuit 124 including the electronic reading/measuring device 34, 80 are arranged ergonomically, that is to say in an arrangement, optimized for the right or alternatively for the left hand, on the exemplary surface 21 of the exemplary housing 20. For an industrial use, it is provided in further exemplary embodiments of the roller tape measure, that this has an exemplary contactless charging device 110 for the exemplary circuit 124 including the electronic reading/measuring device 34, 80 in the form of an exemplary inductively coupled power transmission.

Thus, the exemplary embodiments described herein achieve improved operation, eliminate difficulties encountered in the use of prior devices and systems, and attain the useful results described.

In the foregoing description, certain terms have been used for brevity, clarity, and understanding. However, no unnecessary limitations are to be implied therefrom because such terms are used for descriptive purposes and are intended to be broadly construed. Moreover, the descriptions and illustrations herein are by way of examples and the inventive features are not limited to the exact features shown and described.

Further, in the appended claims, any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

Having described the features, discoveries, and principles of the exemplary embodiments, the manner in which such embodiments are constructed and operated, and the advantages and useful results attained; the new and useful structures, devices, elements, arrangements, parts, combinations, systems, equipment, operations, methods, processes, and relationships are set forth in the appended claims.

| LIST OF REFERENCE NUMBERS | |
|---|---|
| 1 | Roller tape measure |
| 20 | Housing |
| 21 | Surface |
| 30 | Tape measure |
| 31 | Optical coding |
| 32 | Reel |
| 33 | Optical sensor |
| 34 | Electronic measuring device |
| 35 | Scale embodiment |
| 36 | Barcode |
| 40 | Housing slot |
| 50 | Stretching and measuring device |
| 51 | Hook |
| 52 | Reading edge |
| 52b | Reading edge |
| 53 | Tape measure brake |
| 55 | Thumb lever |
| 60 | Scale |
| 70 | Tension spring |
| 80 | Electronic reading device |
| 81 | Operating button |
| 82 | Operating button |
| 83 | Operating button |
| 85 | Rear |
| 88 | Transmitter |
| 100 | Display device (display) |
| 101 | Finger-operable button |
| 110 | Contactless charging device |
| a | First position |
| b | Second position |
| 112 | Bend portion |
| 114 | Shank portion |
| 116 | Length portion |
| 118 | Elongated slot |
| 120 | Projection |
| 122 | Slot end |
| 124 | Circuit |
| 125 | Latch |
| 126 | Sensor |
| 128 | Sensor |

The invention claimed is:

1. A roller tape measure comprising:

a housing, wherein the housing bounds an interior area,
wherein the housing includes an opening, wherein the opening extends through the housing from outside the housing to the interior area, a flexible measuring tape,
wherein the measuring tape extends within the housing interior area and is in operative connection with the housing, and wherein the measuring tape includes a length portion that is selectively variably extendable and retractable through the opening, wherein the length portion extends along a tape direction outside of the housing, wherein the measuring tape includes a measuring tape surface, wherein the measuring tape surface includes scale indicia thereon, whereby the scale indicia is usable for measurement, a hook,
wherein the hook is movably mounted in operative connection with the housing,
wherein the hook is movable relative to the housing along a hook direction parallel to the tape direction independent of extension and retraction of the length portion of the measuring tape,
wherein the hook includes a hook bend portion,
wherein the hook bend portion extends perpendicular to the tape direction, wherein the length portion of the measuring tape is extendable and retractable transversely across the hook bend portion,
wherein the hook bend portion includes a measuring edge that extends perpendicular to the tape direction,
wherein the hook is movable in the hook direction between an extended position and a retracted position,
wherein in the extended position
the hook bend portion is disposed further away from the opening than in the retracted position, and
the measuring edge and the scale indicia on the length portion of the measuring tape extended transversely across the hook bend portion immediately adjacent the measuring edge, are both visually observable, a hook stop,
wherein the hook stop is in operative connection with at least one of the housing and the hook, and is operative to prevent the hook bend portion from being moved in the hook direction away from the housing beyond the extended position,
wherein in the extended position of the hook, the hook bend portion is configured to engage and stretch an article of flexible material for measurement.

2. The roller tape measure according to claim 1 wherein the hook further includes a hook shank portion, wherein the hook shank portion
extends parallel to the tape direction, and
the hook bend portion extends perpendicularly from the hook shank portion.

3. The roller tape measure according to claim 2 wherein the hook stop comprises an elongated hook slot and at least one projection,
wherein the elongated hook slot extends in the hook shank and is bounded in the hook direction by opposing hook slot ends that each extend perpendicular to the hook direction,
wherein the at least one projection is in fixed operative connection with the housing, wherein the at least one projection extends in the elongated hook slot and is engageable in abutting relation with at least one of the hook slot ends,
wherein when the hook is moved from the retracted position to the extended position, the at least one projection is caused to engage the at least one hook slot end, and
wherein engagement of the at least one projection and the at least one hook slot end is operative to prevent the hook from being moved in the hook direction beyond the extended position.

4. The roller tape measure according to claim 3 and further comprising:
a manually actuatable measuring tape brake,
wherein the measuring tape brake is in operative connection with the housing and the measuring tape,
wherein the measuring tape brake is manually engageable from outside the housing, wherein manual engagement of the measuring tape brake is operative to cause the measuring tape brake to be changed between
a tape hold position in which the measuring tape is held in fixed position such that the length portion cannot be extended or retracted, and
a tape release position in which the length portion is enabled to be extended and retracted.

5. The roller tape measure according to claim 4 and further comprising:
a spring,
wherein the spring is in operative connection with the housing and the hook shank portion,
wherein the spring is operative to bias the hook toward the extended position.

6. The roller tape measure according to claim 5 and further comprising:
a manually actuatable latch,
wherein the latch is in operative connection with the housing and the hook, wherein the latch is manually engageable from outside of the housing, wherein manual engagement of the latch is operative to cause the latch to be changed between
a latch hold position in which the latch is operative to hold the hook in the hook retracted position against the biasing force of the spring,
a latch release position in which the hook is enabled to be moved from the hook retracted position to the hook extended position responsive at least in part to the biasing force of the spring.

7. The roller tape measuring according to claim 6 and further comprising:
at least one circuit, and
at least one sensor,
wherein the at least one sensor is in operative connection with the at least one circuit,
wherein the at least one sensor is operative to sense the measuring tape,
wherein the at least one circuit is operative responsive at least in part to the at least one sensor to
determine a measurement value that corresponds to a distance the length portion extends in the tape direction away from the housing beyond the measuring edge.

8. The roller tape measuring according to claim 7 wherein the at least one sensor comprises an optical sensor,
wherein the optical sensor is operative to optically read scale indicia on the measuring tape within the interior area of the housing.

9. The roller tape measure according to claim 7 and further comprising:
a display screen,
wherein the display screen is operatively mounted on the housing and is in operative connection with the at least one circuit, wherein the display screen is configured to display screen outputs thereon,
wherein the at least one circuit is operative to cause the determined measurement value to be output on the display screen.

10. The roller tape measure according to claim 9 and further comprising:
a transmitter,
wherein the transmitter is in operative connection with the at least one circuit, and wherein the at least one transmitter is operative to send at least one signal that is receivable by at least one remote electronic device,
wherein the at least one signal includes data corresponding to the determined measurement value.

11. The roller tape measure according to claim 10 and further including at least one hook sensor, wherein the at least one hook sensor is in operative connection with the at least one circuit,
wherein the at least one hook sensor is operative to sense a current hook position,
wherein responsive at least in part to the at least one hook sensor the at least one circuit is operative to determine the measurement value,
whereby the measurement value is determined responsive to the distance when the hook is in either the extended position or the retracted position.

12. The roller tape measure according to claim 11 wherein the measuring edge of the bend portion of the hook includes one of an outer measuring edge and an inner measuring edge,
wherein the outer measuring edge bounds the bend portion in the tape direction on an outer side of the bend portion that is disposed furthest away from the opening, and
wherein the inner measuring edge bounds the bend portion in the tape direction on an inner side of the bend portion that is disposed closest to the opening.

13. The roller tape measure according to claim 12 and further comprising:
at least one manually actuatable measurement mode switch,
wherein the at least one measurement mode switch is operatively mounted on the housing and is in operative connection with the at least one circuit,
wherein responsive at least in part to the measurement mode switch the at least one circuit is selectively operative to
determine the measurement value relative to the outer measuring edge, or
determine the measurement value relative to the inner measuring edge.

14. The roller tape measure according to claim 1 wherein the hook stop comprises an elongated hook slot and at least one projection,
wherein the elongated hook slot extends in the hook and is bounded in the hook direction by opposing hook slot ends that each extend perpendicular to the hook direction,
wherein the at least one projection is in fixed operative connection with the housing, wherein the at least one projection extends in the elongated hook slot and is engageable in abutting relation with at least one of the hook slot ends,
wherein when the hook is moved from the retracted position to the extended position, the at least one projection is caused to engage the at least one hook slot end,
wherein engagement of the at least one projection and the at least one hook slot end is operative to prevent the hook from being moved in the hook direction beyond the extended position.

15. The roller tape measuring according to claim 1 and further comprising:
at least one circuit, and
at least one sensor,
wherein the at least one sensor is in operative connection with the at least one circuit,
wherein the at least one sensor is in operative connection with the housing and is operative to sense the measuring tape,
wherein the at least one circuit is operative responsive at least in part to the at least one sensor to
determine a measurement value that corresponds to a distance the length portion extends in the tape direction away from the housing beyond the measuring edge.

16. The roller tape measure according to claim 1 and further comprising:
at least one circuit, and
at least one sensor,
wherein the at least one sensor is in operative connection with the at least one circuit,
wherein the at least one sensor is in operative connection with the housing and is operative to sense the measuring tape,
wherein the at least one circuit is operative responsive at least in part to the at least one sensor to
determine a measurement value that corresponds to a distance the length portion extends in the tape direction away from the housing beyond the measuring edge,
a display screen,
wherein the display screen is operatively mounted on the housing and is in operative connection with the at least one circuit, wherein the display screen is configured to display outputs thereon,
wherein the at least one circuit is operative to cause the determined measurement value to be included in at least one display output.

17. The roller tape measure according to claim 1 and further comprising:
at least one circuit, and
at least one sensor,
wherein the at least one sensor is in operative connection with the at least one circuit,
wherein the at least one sensor is in operative connection with the housing and is operative to sense the measuring tape,
wherein the at least one circuit is operative responsive at least in part to the at least one sensor to
determine a measurement value that corresponds to a distance the length portion extends in the tape direction away from the housing beyond the measuring edge,
a display screen,
wherein the display screen is operatively mounted on the housing and is in operative connection with the at least one circuit, wherein the display screen is configured to display outputs thereon,
wherein the at least one circuit is operative to cause the determined measurement value to be included in at least one display output,
a transmitter,
wherein the transmitter is in operative connection with the at least one circuit, and wherein the at least one transmitter is operative to send at least one signal that is receivable by at least one remote electronic device, wherein the at least one signal includes data corresponding to the determined measurement value.

18. The roller tape measure according to claim 1
wherein the measuring edge of the bend portion of the hook includes one of an outer measuring edge and an inner measuring edge,
   wherein the outer measuring edge bounds the bend portion in the tape direction on an outer side of the bend portion that is disposed furthest away from the opening, and
   wherein the inner measuring edge bounds the bend portion in the tape direction on an inner side of the bend portion that is disposed closest to the opening,
and further comprising:
at least one sensor, wherein the at least one sensor is operative to sense the measuring tape,
at least one manually actuatable switch, wherein the at least one manually actuatable switch is mounted in operative connection with the housing,
at least one of
   a display screen mounted in operative connection with the housing, and
   a wireless transmitter,
at least one circuit,
   wherein the at least one circuit is in operative connection with the at least one sensor, the at least one manually actuatable switch, and the at least one of the display screen and the wireless transmitter,
   wherein responsive at least in part to the at least one manually actuatable switch and the at least one sensor, the at least one circuit is operative to
      determine a distance the length portion extends outward in the tape direction relative to either the outer measuring edge or the inner measuring edge, and
      cause the at least one of the display screen and the wireless transmitter to provide at least one output corresponding to the distance.

19. A roller tape measure comprising:
a manually holdable and movable housing, wherein the housing bounds an interior area,
wherein the housing includes an opening, wherein the opening extends through the housing from outside the housing to the interior area,
a flexible measuring tape,
wherein the measuring tape
   extends within the housing interior area and is in operative connection with the housing,
   includes a length portion that is selectively variably extendable and retractable through the opening, wherein the length portion extends along a tape direction outside of the housing, and
   includes a measuring tape surface, wherein the measuring tape surface includes scale indicia thereon, whereby the scale indicia is usable for measurement,
a hook,
wherein the hook is movably mounted in operative connection with the housing, along a hook direction parallel to the tape direction independent of extension and retraction of the length portion of the measuring tape,
wherein the hook includes a hook bend portion,
   wherein the hook bend portion extends perpendicular to the tape direction, wherein the length portion of the measuring tape is extendable and retractable transversely across the hook bend portion,
   wherein the hook bend portion includes a measuring edge that extends perpendicular to the tape direction,
   wherein the hook is movable in the hook direction between an extended position and a retracted position,
   wherein in the extended position
      the hook bend portion is disposed further away from the opening than in the retracted position,
      the measuring edge is disposed a fixed distance away from the opening and the hook is operatively prevented from being moved in the hook direction further away from the opening beyond the extended position,
      the measuring edge and the scale indicia on the length portion of the measuring tape when extended transversely across the hook bend portion immediately adjacent the measuring edge, are both visually observable,
   wherein in the extended position of the hook, the hook bend portion is disposed away from the housing such that an article of flexible material it is engageable with the hook bend portion intermediate of the housing and the hook, whereby the article is stretchable for measurement by manual movement of the housing.

20. The roller tape measure according to claim 19 and further comprising:
a hook stop,
wherein the hook stop is in operative connection with at least one of the housing and the hook, wherein the hook stop is operative to prevent the hook bend portion from being moved in the hook direction away from the opening beyond the extended position.

* * * * *